No. 641,577. Patented Jan. 16, 1900.
D. BUCHANAN.
POTATO DIGGER.
(Application filed Nov. 10, 1899.)
(No Model.)

Witnesses:
Clarence A. Bateman
Percy C. Bowen

Inventor:
David Buchanan.
by Wilkinson & Fisher,
Attorneys.

THE NORRIS PETERS CO., PHOTO-LITHO., WASHINGTON, D. C.

UNITED STATES PATENT OFFICE.

DAVID BUCHANAN, OF AUBURN, VICTORIA.

POTATO-DIGGER.

SPECIFICATION forming part of Letters Patent No. 641,577, dated January 16, 1900.

Application filed November 10, 1899. Serial No. 736,508. (No model.)

*To all whom it may concern:*

Be it known that I, DAVID BUCHANAN, a subject of the Queen of the United Kingdom of Great Britain and Ireland, residing at Auburn, in the Colony of Victoria, have invented certain new and useful Improvements in Potato-Diggers; and I do hereby declare the following to be a full, clear, and exact description of the invention, such as will enable others skilled in the art to which it appertains to make and use the same.

My invention comprises improvements upon the potato-digging machine described in the specification of my United States Patent No. 630,177. I have found it desirable to dispense with the front roller in the construction therein described, and I substitute mechanism which will more effectually deal with and discharge from the machine the potato halms or tops and weeds met with—that is to say, I provide at the machine front a pair of adjustable rollers of special construction, which rotate, as hereinafter described, as the potato-digger is drawn forward. The potato-plant tops, together with any weeds there may be, are taken up between the said rollers and are cast on one side of the machine without finding their way onto the screen or riddle. The potatoes which are prevented from entering between these rollers are taken direct onto the screen and then dealt with as described in my specification of patent aforesaid.

Figure 1:
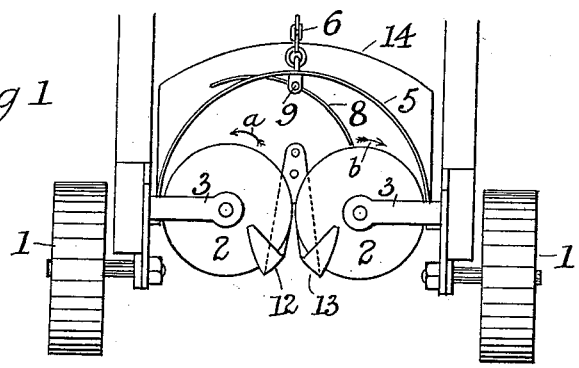
Figure 2:
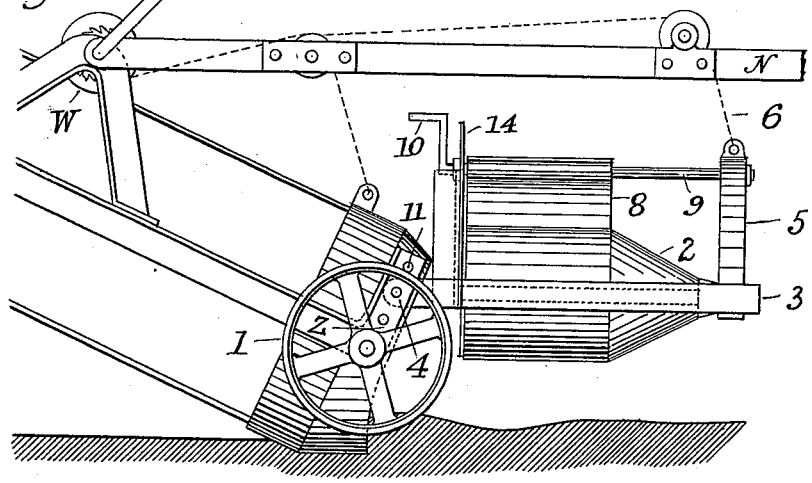
Figure 3:
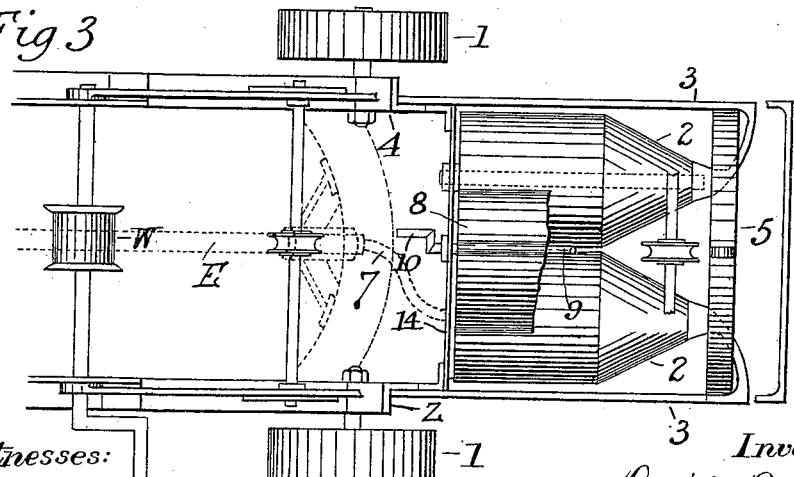

Referring now to the accompanying drawings, in which the invention is illustrated in conjunction with some of the other parts which are described in my former specification, Figure 1 exhibits a front elevation, parts being broken out to more clearly disclose other parts; Fig. 2, a side elevation, and Fig. 3 a plan view.

The machine is now supported at the front by any suitable side wheels 1 1, and to take up the halms and weeds in the path of the machine I provide two rollers 2 2, each tapered at its front end and supported by a frame 3, which is hinged at the point 4 to an upturned portion of the frame Z of the riddle. The front of frame 3 is supported by an arched or other carrier 5, to which is attached a chain or rope 6, connected to windlass W. Either the shaft E of the screw by which the potatoes are carried up the riddle, as described in specification of Patent No. 630,177, is connected to the axle of one of the rollers 2 by any suitable means—for example, by a flexible shaft 7, (shown in Fig. 3 in dotted lines,) so as to cause the roller so connected to turn outwardly, as shown by arrow *a* in Fig. 1, or any other well-known means of giving rotary motion to a roller 2 is adopted.

8 is a movable plate over the rollers, which acts as a guard. It is fitted on a shaft 9 with handle 10, by which it can be suitably adjusted in position, so as to cause the weeds and tops to be thrown out over one or other of the rollers—that is to say, to whichever side of the machine is desired.

The angle-iron main frame Z of the machine, which is turned upward at the front, as already mentioned, has a number of holes 11 in it to enable the hinged roller-frame 3 to be pinned or secured temporarily in suitable adjustment, so that the rollers may be raised or lowered to suit working requirements. By shortening or lengthening the chain 6 the rollers can be caused to work at different angles to suit the work required—that is to say, they are not necessarily horizontal. The wheels 1 1 are preferably also made adjustable in height by any of the numerous known means, for which I claim no novelty and none of which I show. A guard-fork (seen in Fig. 1) is fixed with its prongs 12 13 below the respective rollers on the inner side, as shown, and between these prongs the weeds and halms dealt with will pass. These prongs are set close enough to keep back or strip off any potatoes which may be attached to the stalks as the latter are drawn upward by the action of the rollers. The front of each prong is bent upward to lie close to the tapered part of the rollers. A sheet-metal guard 14 is fixed vertically at the back of the rollers 2 to prevent the weeds, &c., getting to the screen of the machine. The draft is suitably connected in front of the parts shown in the drawings, the rear part of a shaft or pole N being shown in Fig. 2.

In the working of the potato-digger containing my improvements the machine when it moves forward causes the shaft E (of the screw which elevates the potatoes) to revolve, and thus turns one of the rollers 2, as shown by arrow $a$. The weeds and tops met with are received between the tapered or conical parts of the rollers 2, by which they are guided toward the center, so that they there become caught between the rollers and are carried upward, where they meet the curved guard 8, which blocks their progress to one side, leaving them then to be carried over to and dropped clear of the other side of the machine. The rollers 2 will each turn, one as shown by arrow $a$ and the other as indicated by arrow $b$, as soon as weeds get between the rollers, which are adjusted close enough together to effect this purpose.

When the ground is free from weeds and potato-plant tops, the rollers 2 may be detached or disconnected from the digger by suitable pins or connections being used to enable this to be done.

What I claim as my invention, and desire to secure by Letters Patent of the United States, is—

1. In a potato-digger, the combination with the frame thereof of a pair of rollers 2 (each having a tapered front) attached to a frame 3, and pivoted or hinged at the rear 4, to one of a series of holes 11, a carrier 5 and a chain or connection 6 to a windlass as W all substantially as and for the purposes set forth.

2. In a potato-digger, the combination with the frame thereof of a pair of adjustable revoluble rollers each having a tapered front, means (as a flexible shaft) for causing revolution of one of said rollers as the machine advances, a fork beneath and an adjustable guard above the said rollers, and a vertical sheet-metal guard at the rear of the rollers all substantially as and for the purposes set forth.

In testimony whereof I affix my signature in presence of two witnesses.

DAVID BUCHANAN.

Witnesses:
W. H. CUBLEY,
G. G. TURRI.